R. SPELMAN.
Land-Marker.

No. 208,769. Patented Oct. 8, 1878.

Attest:
Frank W. Heers.
Erastus W. Smith.

Inventor:
Rowley Spelman,
By Thomas G. Orwig,
Attorney.

UNITED STATES PATENT OFFICE.

ROWLEY SPELMAN, OF NEWTON, IOWA.

IMPROVEMENT IN LAND-MARKERS.

Specification forming part of Letters Patent No. 208,769, dated October 8, 1878; application filed July 1, 1878.

*To all whom it may concern:*

Be it known that I, ROWLEY SPELMAN, of Newton, in the county of Jasper and State of Iowa, have invented an Improved Land-Marker, of which the following is a specification:

My invention relates to that class of land-markers designed to make continuous marks across a field at uniform distances apart without the aid of stakes or other guiding devices that are extraneous to the machine.

It consists in arranging and combining, with a carriage having three equidistant runners, an auxiliary runner on a reversible hinged arm, cams to support the auxiliary runner, inoperative when desired, and operating mechanism for reversing the hinged arm and adjusting the auxiliary runner, all as hereinafter fully set forth.

Figure 1:
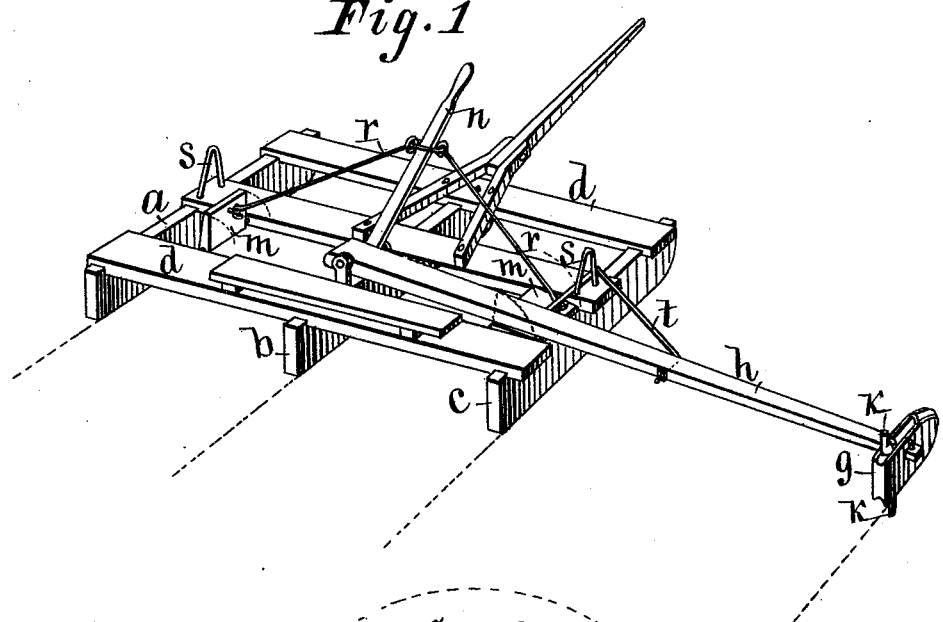
Figure 2:
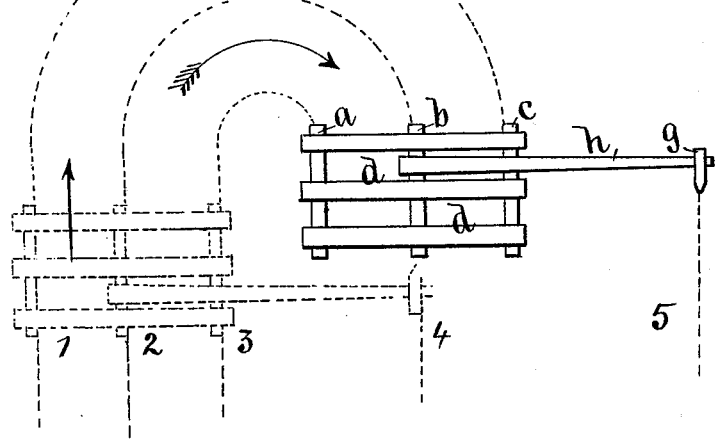

Figure 1 of the drawing is a perspective of my marker, and illustrates its construction and operation. Fig. 2 is a diagram, showing the varying positions in which the carriage and the reversible auxiliary runner are placed in turning around at the end of a field to make a return trip, and to mark three more lines equidistant from each other and from the line last made for a corn-row.

*a b c* represent three runners, of uniform size and shape, and equal distances apart, rigidly combined by means of cross-bars *d d*, in a common way. A tongue or other suitable hitching device is connected with this carriage in any suitable way, so as to allow horses to be attached to drag and guide it across a field.

*g* is an auxiliary runner, carried on the end of a bar, *h*, that is hinged to suitable bars fixed on the top of the central carriage-runner *b*.

*k k* are the projecting ends of an iron bar fixed around the runner *g*, to bind it and to protect it from wear. The ends *k* serve to scratch a mark when the soil is too hard to be indented by the runner, and at all times to aid in making a conspicuous mark and line to guide the operator in a successive trip across the field.

*m m* are blocks of uniform shape and size, hinged inside of the runners *a* and *c*, to perform the functions of cams in raising and lowering the hinged reversible bar *h*, carrying the auxiliary runner *g*.

*n* is a hand-lever, pivoted to the bearing of the hinged bar *h*, and flexibly connected with the hinged blocks *m* by means of rods *r r* of uniform length.

*s s* are standards, projecting upward from the central cross-bar of the carriage, and outside runners *a c*, to engage a loop, *t*, projecting laterally from the central portion of the hinged bar *h*. These standards *s* and the loop *t* may be made of bent iron bars, or of any suitable material, and rigidly attached at their respective places in any suitable way.

In the practical operation of my invention, when two animals are hitched to the carriage, they are driven in a straight line along the side and edge of a plowed field, to drag the runners and cause each one of the four runners to mark a line in the loose soil as the carriage advances. The broken line *x x* in Fig. 2 represents the edge of a field, and the lines 1 2 3 are the marks made by the advancing runners *a b c*. The runners and lines are preferably about forty-five inches apart. The auxiliary runner *g*, carried by the hinged bar *h*, is turned inward from the edge of the field, and is fixed relative to the outside runners, *a c*, so that it will mark a line, 4, inside of the inner line, 3, precisely in the track that the central runner, *b*, will be required to follow on a return trip, in order to make uniform equidistant rows across the entire field.

In turning around at the end of the field the auxiliary runner *g* is readily lifted and made inoperative by simply moving the hand-lever *n* in an opposite direction, and thereby turning up the block or cam *m*, to elevate and support the hinged bar *h*. In this position the projecting runner *g* is carried on the inside of the semicircular movement of the carriage, where it will not come in contact with the fence or other obstructions, and consequently the complete machine can be as readily turned on a small area as if there were no auxiliary projecting runner.

After the machine has been turned so as to bring the central runner, *b*, into the line 4, and the elevated runner *g* over line 3, the hinged bar *h* is swung upward and turned to the opposite side of carriage, to follow the track indicated by the broken line 5 on a return trip across the field.

By successive trips to and fro over the field parallel and equidistant lines are readily marked without measuring spaces, setting stakes, or stretching lines, and much time and labor are thereby saved in the production of corn and other field crops that can be best cultivated when planted in straight rows.

I claim—

1. The combination of the hinged cams or blocks $m\,m$, the reversible runner $g$, carried by the hinged bar $h$, and the operating device $n\,r\,r$, substantially as and for the purposes set forth.

2. The improved land-marker composed of a tractable carriage having three equidistant fixed runners, $a\,b\,c$, the hinged bar $h$, carrying a reversible runner, $g$, the hinged blocks $m\,m$, and their operating device $n\,r\,r$, substantially as shown and described, to be operated in the manner set forth.

ROWLEY SPELMAN.

Witnesses:
A. S. STUVER,
W. H. GRIFFIN.